United States Patent [19]

Adcock

[11] Patent Number: 4,663,805
[45] Date of Patent: May 12, 1987

[54] SHELLFISH PROCESSING

[75] Inventor: John T. Adcock, North Dandenong, Australia

[73] Assignee: Sasakat Pty. Limited, North Dandenong, Australia

[21] Appl. No.: 634,381

[22] Filed: Jul. 25, 1984

[30] Foreign Application Priority Data

Jul. 29, 1983 [AU] Australia .............................. PG0572
Mar. 9, 1984 [AU] Australia ............................. 25507/84

[51] Int. Cl.$^4$ ............................................. A22C 29/04
[52] U.S. Cl. ......................................... 17/48; 17/51; 17/74
[58] Field of Search ................... 17/48, 53, 71, 74, 46, 17/75, 76

[56] References Cited

U.S. PATENT DOCUMENTS

| | | | |
|---|---|---|---|
| 1,685,296 | 9/1928 | Schenk | 17/76 |
| 3,174,180 | 3/1965 | Bertrand | 17/74 X |
| 3,631,567 | 1/1972 | Reinke | 17/76 |
| 3,886,628 | 6/1975 | Berry | 17/76 |
| 4,361,933 | 12/1982 | Rudman et al. | 17/74 X |

Primary Examiner—Willie G. Abercrombie
Attorney, Agent, or Firm—Abelman Frayne Rezac & Schwab

[57] ABSTRACT

The specification describes a method and apparatus for processing bivalve shellfish, particularly scallops. The two shells are first parted by a small amount and a cutting tool is inserted to detach the shellfish from one of the shells. The two shells are then separated. The shell having the shellfish attached is rotated about an axis passing through the center of the edible portion and the offal is cut or blown away from the edible portion and is thrown centrifugally away. The edible portion is then recovered.

27 Claims, 23 Drawing Figures

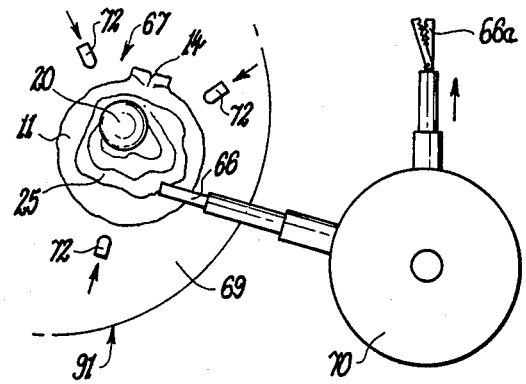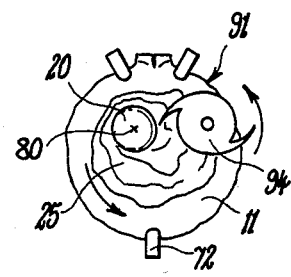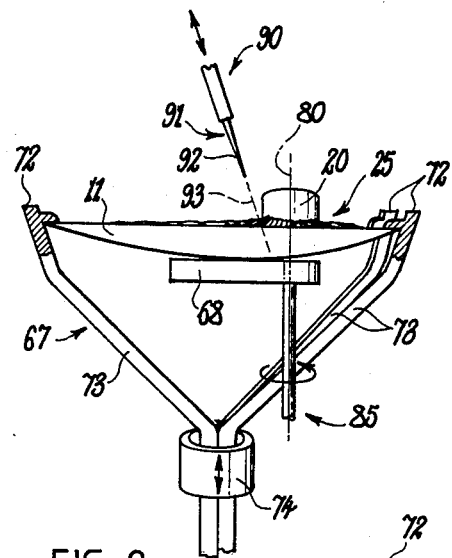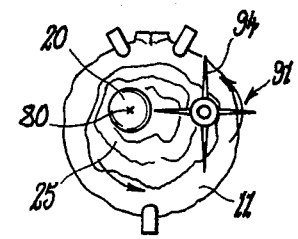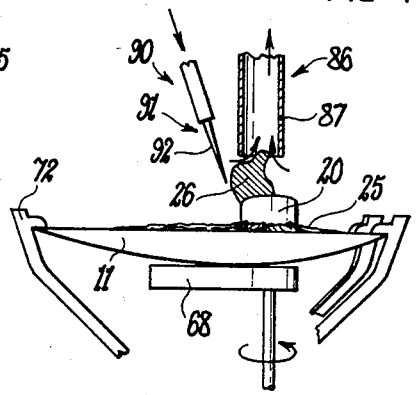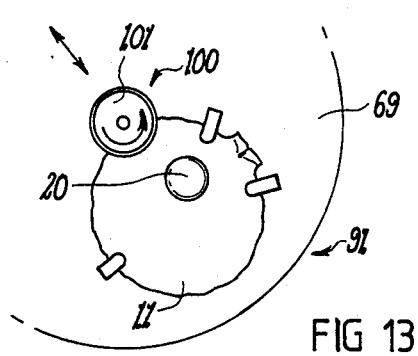

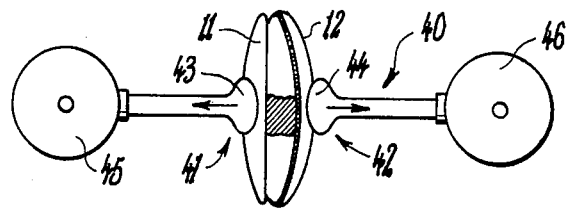
FIG 14
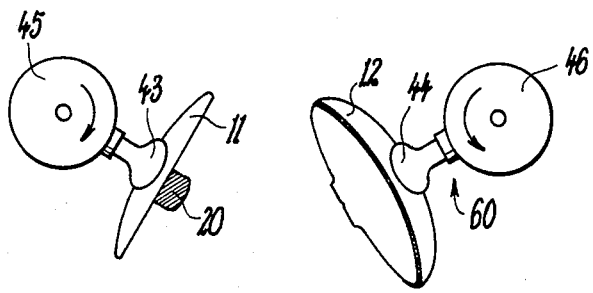
FIG 15
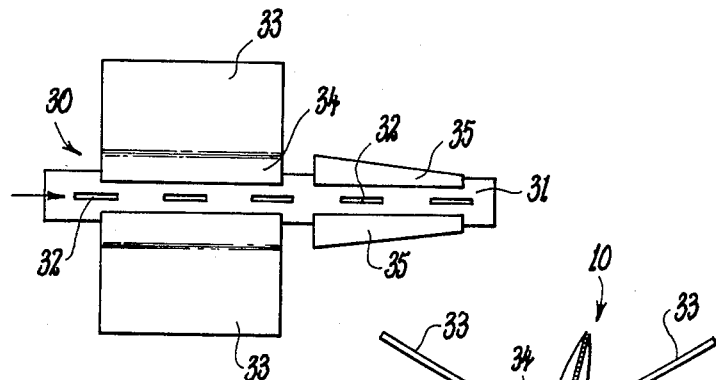
FIG 16
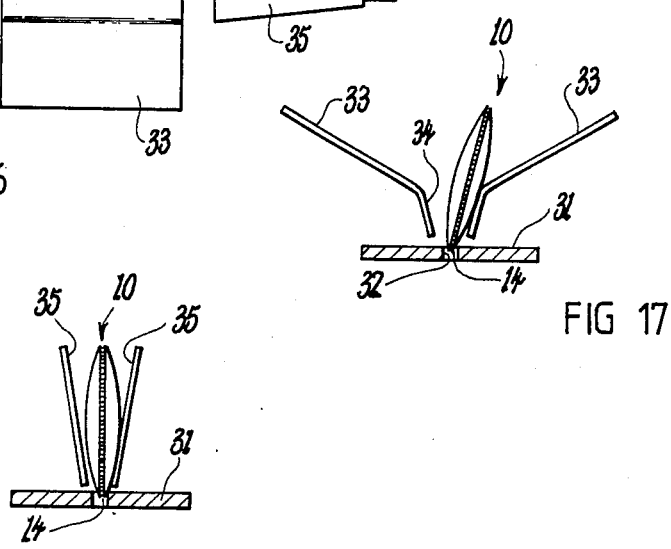
FIG 17
FIG 18

SHELLFISH PROCESSING

This invention relates to the processing of bivalve shellfish and particularly the recovery of the edible portions from their shells. The invention has been particularly developed for removal of scallops but the invention is also applicable to other shellfish where similar problems in recovery of the edible portions of the shellfish are encountered.

The present usual method of processing scallops involves a fully manual operation carried out soon after the scallops are brought to port by the scallop boats. The manual operation involves inserting a knife between the two shells and cutting along the inner surface of a first one of the shells to detach the large adductor muscle from that first shell which is then separated from the other second shell and the first shell is discarded. The offal is then carefully removed from around the outside of the large adductor muscle which is the principal edible portion of the scallop, taking care not to remove the roe which is to be retained in some species of scallop. The large adductor muscle, with or without the roe attached, is then cut from the second shell which is also discarded. A fast and experienced scallop processor can process about six scallops per minute. The operation is labour intensive and the labour costs add substantially to the cost of harvesting, processing and marketing of scallops.

It is known that steaming the fresh scallops will cause some parting of the shells and it is believed that this process has been used to facilitate the initial removal of the first shell. However, the steaming operation at least partially cooks the scallop and this is undesirable.

It is an object of the present invention to provide a method of processing bivalve shellfish for use in recovering the edible portions of the shellfish and which is susceptible to mechanisation of the process.

It is also an object of the present invention to provide apparatus for use in processing of shellfish.

In accordance with the present invention there is provided a method of processing bivalve shellfish for use in the recovery of an edible portion of the shellfish, the method comprising the steps of: parting the two shells of the shellfish, while the two shells are thus parted detaching the shellfish from a detached one of said shells to thereby allow separation of the two shells, and separating the two shells so as to leave an edible portion of the shellfish attached to a retained one of said shells.

The parting step may comprise inserting a parting tool between the two shells at a point other than the region where to two shells are hinged together. Alternatively, the parting step may comprise drawing the two shells apart, such as by applying suction to each shell outer surface by suction means and relatively moving the suction means apart so as to part the two shells.

In general, the preferred method and apparatus according to the present invention will be described with reference to the processing of scallops, but it will be appreciated that the method and apparatus can be used for other shellfish in which similar operations are required during processing.

In the case of the shellfish being a scallop having an adductor muscle which is used by the scallop for opening and closing of the two shells and which is attached to the inner surfaces of both of the shells, the detaching step preferably comprises detaching the adductor muscle from the detached shell at or close to the inner surface thereof.

The present invention also provides apparatus for processing of bivalve shellfish for use in recovering an edible portion of the shellfish, the apparatus including: means for parting the two shells, means for detaching the shellfish from a detached one of said shells while the parting means is holding parted the two shells, and means for separating the two shells so as to leave an edible portion of the shellfish attached to a retained one of said shells.

In one possible embodiment the parting means may comprise a parting tool operable to be inserted between the two shells at a region other than the region where the two shells are hinged together. The parting tool may comprise a parting wedge which is movable relative to the shellfish so as to enter the space between the two shells and thereby part the two shells about the region where they are hinged together.

In an alternative embodiment, the parting means may comprise means for drawing the two shells apart. For example, the means for drawing the shells apart may comprise two suction means arranged to be applied to respective outer surfaces of the two shells, the suction means being selectively movable towards each other so as to engage with an grip by suction the outer surfaces and selectively movable away from each other to draw the two shells apart.

The apparatus preferably further includes feeding means for sequentially feeding shellfish to the parting means. The feeding means may comprise a conveyor having longitudinally spaced slots along its length. The apparatus may further include an inclined feed chute sloping down to the conveyor and arranged so that shellfish can be fed onto the conveyor with the hinge region of each shellfish being arranged to be received in a respective one of the slots. In this way, the shellfish are positively located for sequentially being fed to the parting means.

The detaching means of the apparatus preferably comprises cutting means operative to be inserted between the two shells when they are held parted by the parting means and closely adjacent to the inner surface of the detached shell. The cutting means preferably comprises a cutting blade which is flexible so as to follow the inner surface of the detached shell and thereby cut the attachment of the shellfish to that detached shell closely adjacent to its inner surface.

The present invention also provides a method of processing bivalve shellfish for use in the recovery of an edible portion of the shellfish, the method comprising the steps of: detaching the shellfish from a detached one of the two shells so as to allow separation of the shells, separating the two shells leaving edible and offal portions of the shellfish attached to the other retained one of said shells, holding the retained shell and, while holding the retained shell, rotating the retained shell about an axis transverse to the general plane of the retained shell, and while rotating the retained shell, separating offal from the edible portion to be recovered.

In this method according to the invention, the axis of rotation preferably passes through the shell and most preferably passes through the general centre of the edible portion of the shellfish.

The step of separating the offal may comprise severing the offal from the edible portion. Alternatively, the separating step may comprise directing a fluid stream at the retained shell so as to contact the offal and detach the offal from the edible portion.

In the case of the shellfish comprising a scallop having a mantle to be separated as offal and roe to be retained as part of the edible portion recovered, the method preferably further includes the step of holding the roe away from the mantle to be separated as offal while the retained shell is rotated and the offal is separated.

The speed of rotation of the retained shell is preferably chosen so as to be sufficient for the offal to be thrown centrifugally away from the rotating retained shell during the offal separating step so as to leave only the edible portion attached to the retained shell.

The present invention further provides apparatus for processing bivalve shellfish for use in the recovery of an edible portion of the shellfish, the apparatus comprising holding means for holding a retained one of the shells having the edible portion and an offal portion attached thereto after separation of the other detached one of the two shells, rotating means for rotating the held retained shell about an axis extending transverse to the general plane of the shell, and separating means for separating offal from the edible portion to be recovered while the shell is being rotated about said axis.

As in the case of the method, the axis of rotation of the retained shell preferably passes through the retained shell, and most preferably through the general centre of the edible portion of the shellfish.

In one possible embodiment of the apparatus, the holding means includes a suction applying head engageable with the outer surface of the retained shell so as to hold the same against movement relative thereto, the area of engagement of the suction applying head being located directly behind the edible portion of the shellfish attached to the inner surface of the retained shell, the rotating means being operable to rotate the suction applying head about the axis extending through the general centre of the edible portion. In this particular arrangement of the holding means, it is preferred that the suction applying head and the retained shell be movable relative to each other before engagement of the suction applying head with the outer surface of the retained shell. This will enable accurate engagement of the suction applying head directly behind the edible portion. Furthermore, to achieve this accurate engagement, the apparatus may further include edible portion locating means operable to optically scan the shellfish to detect the position of the edible portion thereof, and control means responsive to the locating means and operable to control relative movement of the suction applying head and retained shell during mutual engagement so as to achieve the accurate engagement of the suction applying head directly behind the edible portion.

The separating means in one embodiment may comprise severing means for severing offal from the edible portion while the retained shell is rotated. In an alternative embodiment, the separating means may include means for directing a fluid stream at the inner surface of the retained shell having the edible portion of the shellfish attached thereto so that the fluid stream separates the offal from the edible portion. A suitable fluid stream may be a jet of pressurised air.

In an alternative apparatus to the embodiment described above where the holding means comprises a suction applying head, the holding means may comprise clamping means for clamping peripheral portions of the retained shell. For example, the clamping means may comprise a plurality of flexible clamping arms initially arranged to receive the retained shell between the arms, the arms then being movable radially inwardly into clamping engagement with the shell periphery.

In the case where the shellfish comprises a scallop having a mantle to be separated as offal, and roe to be retained as part of the edible portion, the apparatus preferably includes means for holding the roe away from the mantle to be separated as offal while the retained shell is rotated and the mantle separated. The means for holding the roe may comprise a suction tube having an open mouth which is relatively movable into close proximity with the roe so as to draw the roe into or towards the mouth without tearing the roe from the scallop adductor muscle.

The apparatus preferably includes indexing means mounting the rotating means and for sequentially moving the retained shell through an offal removal station at which the rotating means is operable to rotate the retained shell and the separating means is operable to separate the offal from the edible portion to be recovered, and through an edible portion recovery station where the edible portion is recovered from the retained shell after the offal has been separated.

In an alternative arrangement the holding means may be mounted so as to hold the retained shell generally at one site, and in this arrangement the apparatus may further include an indexing means having mounted thereon so as to be sequentially presentable at the site, a detached shell separating means for separating the detached shell from the retained shell, the separating means, and recovery means for recovering the edible portion from the retained shell.

In the case where the severing means comprises a severing blade, the blade may be movable relative to the rotating retained shell along a line arranged so that the offal is severed from the edible portion. In the case of the shellfish comprising a scallop and in which the edible portion to be recovered comprises the adductor muscle, the severing blade would be arranged to be relatively moved along a line so as to just touch the outer periphery of the adductor muscle. This line may be arranged at a small angle to the axis of rotation of the retained shell to thereby ensure that all the offal is removed from the base of the edible portion adjacent to the inner surface of the retained shell.

The rotating means is preferably operable to rotate the retained shell at a speed chosen such that as the offal is separated from the edible portion to be recovered, the offal is thrown centrifugally away from the rotating retained shell and edible portion, leaving only the edible portion attached to the retained shell.

The apparatus preferably further includes recovering means for recovering the edible portion after offal separation, the recovering means preferably including a removal tool arranged to be passed beneath the edible portion along the inner surface of the retained shell to which it is attached.

The present invention will now be further described in its preferred aspects in relation to the accompanying drawings, in which.

Figure 5:
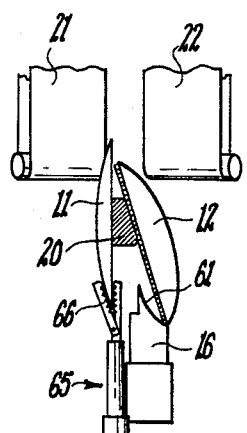
Figure 6:
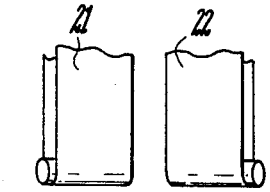
Figure 7:
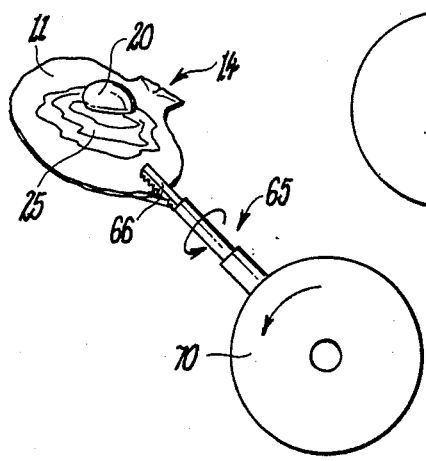
Figure 19:
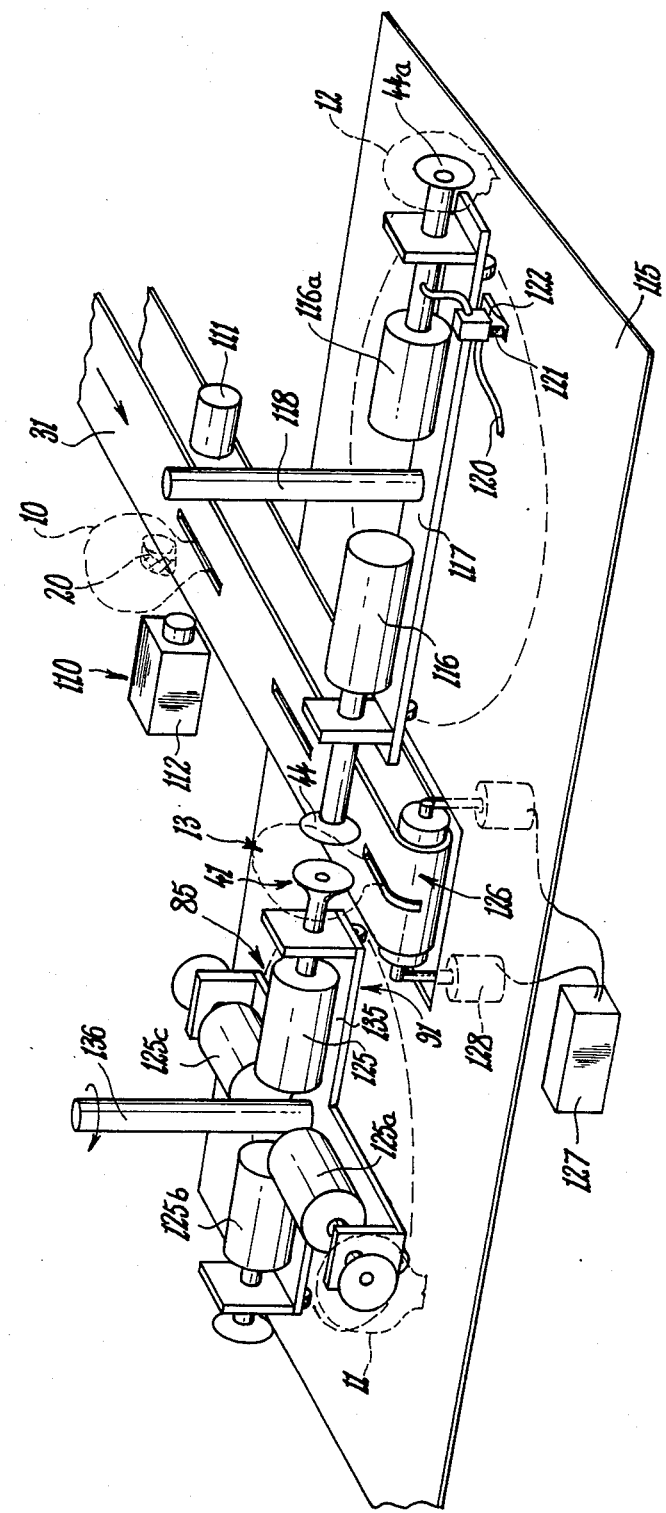
Figure 20:
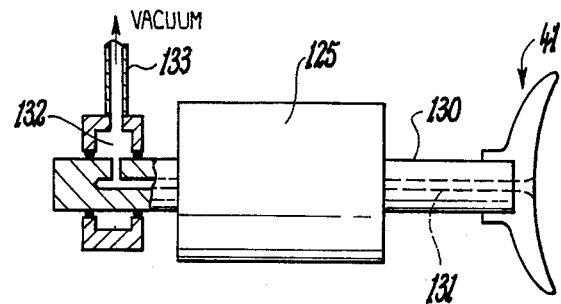
Figure 21:
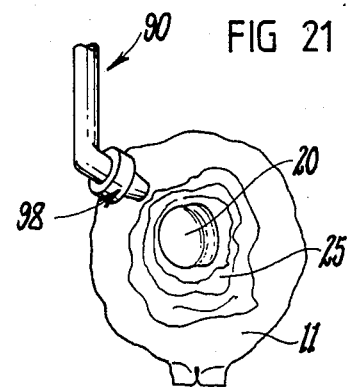
Figure 22:
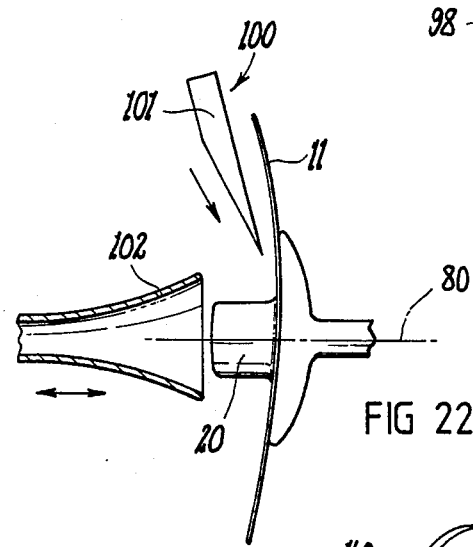
Figure 23:
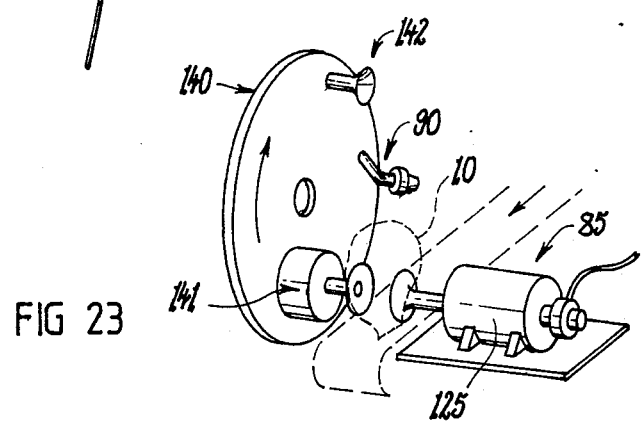

FIG. 5 shows one means for gripping the retained shell and means for separating the detached shell, FIGS. 6 and 7 show operation of the gripping means of one embodiment, FIG. 8 shows how the gripping means transfers the retained shell to the holding means, FIG. 9 shows one form of holding means, rotating means and separating means, FIGS. 10 and 11 show alternative possible separating means, FIG. 12 shows a means for holding scallop roe away from the mantle, FIG. 13 shows one possible edible portion recovery means, FIGS. 14 and 15 show an alternative parting and separating means using suction, FIGS. 16 to 18 show a feeding means using a slotted conveyor and feed table, FIG. 19 shows a perspective view of a possible working configuration of apparatus according to the present invention, FIG. 20 shows one way of applying vacuum through the drive shaft of an air motor, FIG. 21 shows schematically an alternative offal separating means utilizing a fluid stream, FIG. 22 shows schematically one form of edible portion recovery means, FIG. 23 shows schematically a further possible working arrangement of apparatus according to the present invention.

Figure 1:
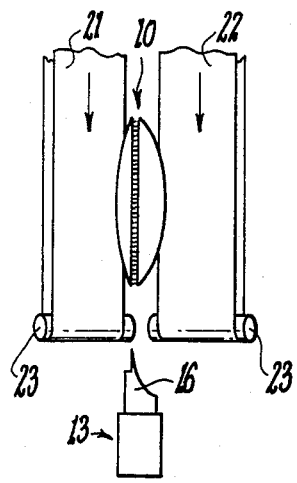
FIGS. 1 and 2 illustrate in top view a first apparatus for parting the shells.
Figure 2:
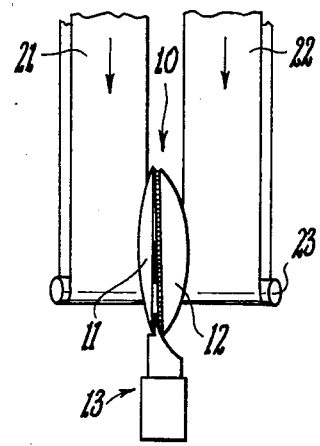

Referring now to the drawings, and particularly initially FIGS. 1 to 5, the preferred method according to the present invention illustrated in those Figures includes as shown in FIG. 2 the step of parting the two shells or valves 11,12 of the shellfish 10. This is achieved in FIG. 2 by inserting a parting tool 13 between the shells 11,12 at a point other than the region 14 (FIG. 4) where the two shells are hinged together. In the case where the shellfish 10 comprises a scallop, assuming the shells 11,12 are arranged so as to be generally vertical with the hinged region 14 at the bottom, in some species of scallop there occurs naturally a small gap between the two shell peripheries 15 located a short distance above the region 14 where the two shells 11,12 are hinged together. The parting tool 13 is arranged to be inserted between the two shells 11,12 through this gap. Alternatively, a segment of the outer periphery 15 of the two shells 11,12 may be removed, such as by means of a high speed circular saw or the like cutting in a plane perpendicular to the general plane of symmetry of the shells 11,12 so as to leave a gap at one edge of the shells 11,12 where the parting tool 13 can be inserted. This alternative embodiment is not illustrated.

The illustrated parting tool 13 comprises a parting wedge 16 which is movable relative to the shellfish 10 so as to enter the space between the two shells 11,12 and thereby part the two shells 11,12 about the region 14 where they are hinged together. The parting wedge 16 includes a limit shoulder 17 (FIG. 3) at one side thereof, the limit shoulder 17 being arranged to be engaged by the periphery 15 of the shell 11 so as to limit penetration of the point of the wedge 16 into the space between the two shells 11,12 and thereby avoid damaging the edible portion 20 of the shellfish 10.

For carrying out the parting step as shown in FIGS. 1 and 2, the shellfish 10 can be held generally upright between two conveyor belts 21,22 arranged to define a generally V-shaped space between the belts 21,22. The belts 21,22 run at the same speed and hold the shellfish 10 upright so that the hinge area 14 is at the bottom of the shellfish 10. The conveyor belts 21,22 are resilient so as to firmly hold the shellfish 10 without damage by crushing. The conveyor belts 21,22 each turn around a roller or sprocket 23 or the like to return to the region where they are supplied with the shellfish 10 sequentially, the return point being located so that the belts 21,22 hold the shells 11,12 generally centrally at their return points when the parting wedge 16 has entered the space between the shells 11,12 to its deepest extent.

In an alternative arrangement, illustrated in FIGS. 16 to 18, the apparatus may include feeding means 30 for sequentially feeding shellfish 10 to the parting means 13. In FIGS. 16 to 18, the feeding means 30 comprises a conveyor 31 having longitudinally spaced slots 32 along its length. The apparatus further includes a feed table 33 and an inclined feed chute 34 sloping down to the conveyor 31 and arranged so that shellfish 10 can be fed onto the conveyor 31 with the hinge region 14 of each shellfish 10 being arranged to be received in a respective one of the slots 32. As shown in FIGS. 16 and 18, the apparatus further includes two inclined walls 35 defining a generally V-shaped feed channel along the bottom of which the conveyor 31 is arranged to run. The angle defined between the walls 35 of the feed channel progressively becomes smaller in the direction away from the feed shute 34 and towards the parting means so that shellfish 10 being conveyed by the conveyor 31 are brought to an upright position as they engage with the inclined walls 35, and as shown in FIG. 18. The angles to the vertical defined by the walls 35 may progressively change from say, 30°, to say, 11°.

In an alternative embodiment of the invention the parting step may comprise drawing of the two shells 10,11 apart. Parting means 40 for drawing the two shells apart is schematically illustrated in FIG. 14. In this Figure, the means 40 for drawing the two shells 11,12 apart comprises two suction means 41,42 arranged to be applied to respective outer surfaces of the two shells 11,12. The suction means 41,42 are selectively movable towards each other so as to engage with and grip by suction the outer surfaces and selectively movable away from each other to draw the two shells 11,12 apart so as to thereby part the two shells 11,12.

In FIG. 14 the two suction means 41,42 comprise a pair of opposed suction cups 43,44 engageable respectively with the outer surfaces of the two shells 11,12, each of the suction cups 43,44 being arranged to be selectively connected to a vacuum source (not shown) to thereby securely hold the respective shell 11,12 when engaged with the outer surface thereof and supplied with a vacuum. The suction cups 43,44 are movable apart to a predetermined extent as shown in FIG. 14 so as to part the two shells 11,12. In FIGS. 14 and 15 it can be seen that the suction cups 43,44 are mounted on respective rotary heads 45,46 operable to be rotated so as to intermittently present the suction cups 43,44 at the shell parting station so that as a shellfish 10 to be subsequently processed is presented at the shell parting station, the rotary heads 45, 46 are operable to synchronously present the rotary mounted suction cups 43,44 to the outer surface of the shells 11,12. However, as described later for example with reference to FIG. 23, one only of the suction cups 43,44 need be mounted to a rotary head.

This arrangement using suction cups 43,44, is envisaged to be suitable to scallops having relatively smooth outer surfaces such as the species to be found in northern Australian coastal waters. With other species having prominent radially arranged ribs on the outer surfaces of the shells 11,12, the suction cups 43,44 may be provided with complementary peripheries so as to closely engage with the shell outer surfaces and provide at least a moderate seal with the outer surface enabling sufficient parting force to be applied. Alternatively, the cups 43,44 may have soft resilient peripheries to deform and closely engage the outer surfaces of the ribbed shells. Of course, with ribbed shells, it is envisaged that the insertion of a parting wedge 16 as shown in FIGS. 1 to 3 between the shells 11,12 will also be a suitable method of parting the shells.

The feeding of the shellfish 10 sequentially to the rotary heads 45,46 carrying the suction cups may be achieved by arranging the shellfish 10 between conveyor belts or on a slotted belt as with the embodiments described above with reference to FIGS. 1 and 2 and FIGS. 16 to 18. In both cases, the shellfish 10 may be manually placed within the space between the conveyor belts 21,22 in the desired orientation or on the slotted belt 31 although it is envisaged that this feeding operation may be susceptible to automation. Also, it is envisaged that the shellfish 10 may desirably be graded according to size when being fed onto the conveyor belt(s). Such grading, which may be into two, three or more size ranges, may be desirable so that subsequent operations will be carried out on generally similar sized shellfish, particularly in the case of fully mechanised recovery of the edible portions of the shellfish. Thus, it may be desirable to provide two or more similar shellfish removal apparatuses according to embodiments of the present invention, each one being arranged to process shellfish of one particular size range. Alternatively, rather than manual or automated grading according to size, as described later, for example with reference to FIG. 19, provision may be made for automatically compensating for size variations in the shellfish. It is envisaged that the method and apparatus will be suitable for either processing on board a scallop boat or on shore at a processing plant.

The next step of the preferred method according to the invention comprises detaching the shellfish from a detached one 12 of the shells 11,12 while the two shells 11,12 are parted. This will allow subsequent separation of the two shells 11,12. In the preferred method, the detaching step comprises cutting the shellfish attachment to the detached shell 12, the cutting of the attachment to the detached shell 12, being at or close to the inner surface of the shell 12, in the case of scallop processing the edible portion 20 (FIGS. 3 and 4) comprises the adductor muscle which is used by the shellfish for opening and closing of the two shells 11,12 and which is attached to the inner surfaces of both of the shells 11,12. In this case, the detaching step comprises detaching the adductor muscle 20 from the detached shell 12 at or close to the inner surface thereof. The adductor muscle 20 is strongly attached to both of the shells. In the case of scallops, it is generally considered immaterial which of the two shells 11,12 is cut away, but it is preferred that for subsequent operations a particular one of the shells 11,12 is consistently the one to be cut away. In this connection, it is to be noted that scallops are not perfectly symmetrical shellfish—the lower lighter coloured shell 12 generally being more deeply concave that the flatter darker coloured upper shell 11. For reasons that will be explained later, it may be preferred that the deeper concave lower shell 12 be the detached shell that is cut away at this stage of the method leaving the adductor muscle 20 attached to the flatter upper shell 11.

Figure 3:
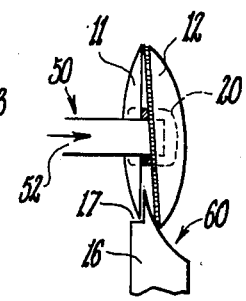
FIGS. 3 and 4 show top and side views of one possible detaching means.
Figure 4:
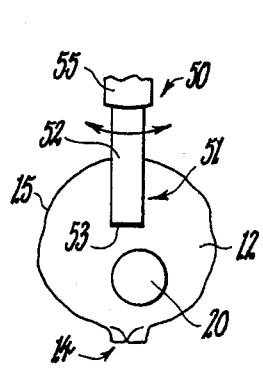

Referring now in more detail to FIGS. 3 and 4, the illustrated apparatus includes means 50 for detaching the shellfish from the detached shell 12 while the parting means 13 is holding parted the two shells 11,12. The detaching means 50 is illustrated as cutting means 51 operative to be inserted between the two shells 11,12 when held parted by the parting means 13 and closely adjacent to the inner surface of the detached shell 12. The cutting means 51 comprises a cutting blade 52 which is flexible so as to follow the inner surface of the detached shell 12 and thereby cut the attachment of the shellfish to that shell 12 closely adjacent to its inner surface. The cutting blade 52 is inserted between the shell peripheries 15 generally opposite to the hinged region 14 and at a shallow angle to the general plane of symmetry of the parted shells 11,12 to as to engage with the inner surface of the shell 12. The cutting blade 52 is flat and elongated having a cutting edge 53 along its leading extremity which enters the space between the parted shells 11,12 and passes along or close to the inner surface of the shell 12. The apparatus also includes means 55 of any suitable form for oscillating the cutting blade 52 in the general plane thereof as it is moved between the shells 11,12 so as to provide a sawing action facilitating cutting of the shellfish attachment.

With this arrangement, as the cutting blade 52 moves deeper into the parted shells 11,12 the blade 52 at least partially severs the adductor muscle 20 from the shell 12. Since the muscle 20 is under considerable tension due to the parting action, a slight cut may cause tearing through the remainder of the muscle 20. The depth to which the cutting blade 52 is lowered in the cutting operation will be dependant on the size of the shellfish 10 and this may render grading of the shellfish before processing into different size ranges preferable. However, some sensing of the size of each shellfish as it is being fed to the apparatus may be performed so that the extent of travel of the cutting blade may be determined in response to the sensed shellfish size. It has been found that a total travel of about 10 cm will generally be sufficient in moving from a retracted position clear of the shells to an advanced position where cutting of the adductor muscle occurs.

After detaching the shellfish from shell 12, the next step of the method involves separating the two shells 11,12 so as to leave the edible portion 20 attached to shell 12. Shell 12 can then be discarded. In the case of scallops, the retained shell 11 may be the flatter shell, the more deeply concave shell 12 being discarded. In using wedge 16 to part the shells 11,12 it has been found that the outer edge of the mantle (i.e. the soft tissues in contact with most of the shell inner surfaces) may be removed with the discarded shell 12. This outer edge portion includes the eyes of the scallop.

In the apparatus of the invention there is provided means 60 for separating the two shells 11,12 so as to leave the edible portion 20 attached to the retained shell 11. In the case of the use of a parting wedge 16, the separation of the shells 11,12 may be achieved as shown in FIG. 5 by driving to one side of the parting wedge 16 the shell 12 from which the attachment was cut. The limit shoulder 17 provided on the wedge 16 is located so as to be engaged by the shell 11 which is to be retained for further processing and the opposite side of the wedge 16 has an arcuate shaped surface 61 so as to curve outwardly to promote separation of the shells 11,12. That is, as the attachment is cut, in the case of the two belt support 21,22 the belt 22 engaging with the shell 12 forces the leading edge of that shell around the curved surface 61 of the wedge 16 and the shells 11,12 will open about the hinge area 14 and enable separation of the shell 12 from the shell 11. The retained shell 11 may be held stationary against the limit shoulder 17 while the detached shell 12 is being separated, the belt 21 is contact with the retained shell 11 slipping against the outer surface of that shell 11 during this process. The outer edge of the mantle containing the eyes of the scallop it is believed will be torn away with the detached shell 12 during this process.

In the case of the use of suction cups 43,44 (FIGS. 14 and 15) on rotary heads 45,46 being used for the parting of the shells 11,12, the separating means 60 comprises means for relatively moving the suction cups 43,44 further apart after the detaching means (not shown in FIGS. 14 and 15) has detached the edible portion 20 from shell 12. As the rotary heads 45,46 further rotate as shown in FIG. 15, the shells 11,12 will be further separated and the one 12 from which the edible portion 20 was cut can be discarded by discontinuing application of vacuum to the suction cup 44 holding that shell 12 thereby allowing the detached shell 12 to drop away from the suction cup 44.

Returning to FIGS. 5 and 6, the apparatus further includes receiving means 65 for receiving the retained shell 11 after separation of the detached shell 12. The receiving means includes a gripping tool which may be operable to grip shell 11 when it is first parted from the shell 12, or when the detaching operation is carried out, or immediately after the detaching operation. The gripping tool 66 is operable to grip the peripheral edge of the retained shell 11 so that after separation of the shells 11,12 the retained shell 11 is gripped preliminary to further processing. The grouping tool 66 may be of any convenient construction and the illustrated tool includes a pair of jaws arranged to grip a leading edge portion, i.e. located above the region where the wedge 16 enters between the shells 11,12. As shown in FIG. 6, the gripping tool 66 after separation of the shells 11,12 is retractable so as to hold the retained shell 11 beyond the return points of the conveyor belts 21,22. During this retraction of the gripping tool 66, the wedge 16 is also shown as being retracted, preferably at a faster rate or to a point further from the return points of the conveyor belts 21,22 so as to be clear of the retained shell 11. At this stage of the operation, the retained shell 11 is still held in a generally upright condition.

Referring to FIGS. 7 and 8, after separation of the shells 11,12 the receiving means 65 is operable to lay the retained shell 11 flat so that the general plane of the shell 11 is horizontal, preferably with the edible portion 20 on the upper face of the shell 11, although it is envisaged that it may be possible to carry out the subsequent steps with the edible portion depending from the lower surface of the laid flat shell 11. The apparatus includes holding means 67 for holding the retained shell 11. In FIG. 9 the holding means 67 includes a support base 68 located on a rotary processing table 69 arranged to receive thereon the laid flat shell 11. The gripping tool 66 is mounted on a rotary head 70 which is operable to rotate to as to transfer the shell 11 to the rotary processing table 69, the gripping tool 66 being arranged to lay the shell 11 flat on the support base 68. After or during rotation of the head 70 the gripping tool 66 may be operable to both extend from the retracted position (FIG. 6) and to rotate about the line of extension as shown in FIG. 7 so as to turn the shell 11 with the inner surface and edible portion 20 facing upward. The rotary head 70 may be intermittently driven so as to stop when the gripping tool 66 is holding the shell 11 immediately above the support base 68 on the processing table 69, the gripping tool 66 being operable to release the shell 11 in that position and retract from the processing table 69. As shown in FIG. 8, the rotary head 70 mounting the gripping tool 66 is provided with one or more further gripping tools 66a so that as the retained shell 11 is being transferred to the processing table 69 the further gripping tool 66a is being located so as to grip the retained shell of a subsequent shellfish being processed.

The holding means 67 for retaining shell 11 against movement is operable to clamp the periphery 15 of the shell 11. For this purpose, the clamping means 67 as seen in FIGS. 8 and 9 comprises a plurality of clamping jaws 72 initially arranged (FIG. 8) to receive the shell 11 between the jaws 72, the jaws then being movable radially inwardly into clamping engagement with the shell periphery 15. As shown, the shell can be held by three clamping jaws 72, although more clamping points can be provided if desired. For the case of scallops, as shown in FIG. 8, the clamping points can be constituted by the two concave regions of the shell periphery 15 located between the wing-like projections on each side of the hinge 14 and the fan-shaped periphery of the major part of the shell 11, the remaining third clamping point being at the top centre of the fan-shaped major portion of the body of the shell 11, i.e. generally diametrically opposite the centre of the hinge region 14. As shown in FIG. 9, the clamping jaws 72 are arranged on flexible clamping arms 73 which extend downwardly beneath the shell 11. The three arms converge to enter within a clamping sleeve 74 which is selectively vertically movable to clamp and unclamp the shell 11. That is, the three flexible arms 73 are initially located radially outwardly beyond the periphery 15 of the shell 11 and then the clamping sleeve 74 is moved upwardly so as to draw the three arms 73 radially inwardly to engage and clamp the shell. It is at this point that the gripping tool 66 may be arranged to release the shell 11 and retract back to the rotary head 70 on which it is mounted.

The process of the invention also includes rotating the retained shell 11 while holding the same, the rotation being about an axis transverse to the general plane of the retained shell 11, and while rotating the retained shell 11, separating the offal 25 from the edible portion 20 to be recovered. The axis 80 (FIG. 9) about which rotation occurs extends through the shell 11 and through the general centre of the edible portion 20 substantially at right angles to the general plane of the shell. For carrying out this part of the method, the apparatus includes rotating means 85 for rotating shell 11 about the axis 80 and separating means 90 for separating offal 25 from the edible portion 20 to be recovered while the shell 11 is being rotated.

During the rotation and offal separation, if roe 26 (FIG. 12) is to be retained as part of the edible portion 20, the roe 26 is preferably held away from the mantle 25 to be separated as offal while the shell 11 is rotated and the offal 25 is separated. In the case of scallop processing in which the flatter shell 11 is retained, the roe 26 will be at the top and may be lifted away from the remainder of the mantle 25 and held generally above the adductor muscle 20. As shown in FIG. 12, the apparatus includes means 86 for lifting and holding the roe 26. The holding means 86 comprises a suction tube 87 which is movable into close proximity with the roe 26 so as to draw the roe into or towards the mouth of the suction tube 87 without tearing the roe from the scallop adductor muscle 20. The suction tube 87 may be arranged directly above the general centre of the roe 26 which is located to one side of the axis 80 (FIG. 9) running through the adductor muscle 20. Alternatively, the suction tube 87 may be located on the central axis 80 of the adductor muscle 20 so as to draw the roe 26 inwardly towards that axis 80 and upwardly into the mouth of the tube 87. In the case of a tube 87 located coaxially with the axis 80 of the adductor muscle 20, the lower end portion of the tube 87 may be rotatable about the axis of the remainder of the tube so as to avoid the possibility of the roe 26 becoming twisted and tearing away from the remainder of the edible portion 20 as the shell 11 is rotated. Alternatively, the tube 87 may be rotated together with the shell 11 at the same speed of rotation to avoid roe twisting. However, in the case where the lower end portion of the tube 87 is rotatable relative to the remainder of the tube, rotation of the entire suction tube assembly is not necessary, since the lower end portion having the roe 26 drawn into the mouth will rotate with the shell 11 and with the edible portion 20 including the roe 26, thereby obviating the possibility of roe twisting. It will be appreciated, however, that as an alternative to the use of a suction tube 87, the roe may be lifted and held during separation of the offal by pinching and lifting the roe 26 away from the remainder of the mantle 25 to be removed as offal.

Returning now to the rotation of the shell 11, in the case of scallops, the rotation axis 80 is desirably the line running through the centre of the large adductor muscle 20 and at right angles to the general plane of the shell 11. For scallops, the adductor muscle 20 has been found to be consistently located with its axis running through a point located a little towards the hinge region 14 from the geometric centre of the shell 11 and displaced a little to the right of the centre line through the hinge region 14 (looking down on the inner surface of the flatter darker coloured shell 11). Thus, the rotation axis 80 can be generally known in advance, provided the retained shell 11 is always a predetermined particular one of the two shells 11,12.

The holding means 67 includes support base 68 on which the shell 11 is located and held, and the rotating means 85 is operable to rotate the support base 68 and the holding means 67 about the axis 80. In FIGS. 8 and 13, the apparatus includes indexing means 91 comprised by the rotary processing table 69 and for relatively moving the shell 11 through a series of operating stations, including an offal removal station where the rotating means 85 is operable to rotate the shell 11 as shown in FIGS. 9 and 12 and the separation means 90 is operable to separate the offal 25 from the edible portion 20 to be recovered. The method also includes recovering of the edible portion 20 attached to the retained shell 11 after separating the offal 25. Therefore, the indexing means 91 is also operable to move the shell 11 through an edible portion recovery station (FIG. 13) where the edible portion 20 is recovered from the shell 11 after offal separation. In particular, in FIGS. 8 and 13, the holding means 67 includes support base 68 on which the shell 11 is laid and held, and the rotary processing table 69 is movable so that the shell 11 is sequentially moved through a series of the operating stations, including a loading station at which the shell 11 is laid on the support base 68 (as shown in FIG. 8), the offal removal station where the operations shown in FIGS. 9 to 12 are carried out, and the edible portion recovery station to be described in relation to FIG. 13. The processing table 69 includes at least one further support base 68 (not shown) so that as the table 69 is rotated to advance the support base 68 to one of the operating stations, the further support base is being advanced to a different one of the operating stations.

The step of separating the offal 25 in one embodiment (FIGS. 9 to 12) comprises severing the offal 25 from the edible portion 20. For this purpose, the separating means 90 of the apparatus comprises severing means 91 for severing the offal 25 from the edible portion 20 while the shell 11 is rotated. The severing means 91 in FIGS. 9 and 12 comprises a severing blade 92 which is movable relative to the rotating shell 11 along the line 93 arranged such that the offal 25 is cut from the edible portion 20. In the case of scallop processing, the severing blade 92 is arranged to be moved along the line 93 so as just to touch the outer periphery of the aductor muscle. The line 93 is arranged at a small angle to the axis 80 to ensure that all the offal 25 is removed from the base of the edible portion 20 adjacent to the inner surface of the shell 11. The blade 92 is preferably relatively stiff.

The rotational speed of the shell 11 is preferably sufficient for the offal 25 to be thrown centrifugally away from the shell 11 during the offal separation so as to leave only the edible portion 20 attached to the shell 11. It has been found that a rotational speed of 200 to 300 rpm is suitable for offal removal using the knife blade 92 with scallops from Northern Australian waters. The severing blade 92, of course, need not be rotating around the muscle axis but may move downwardly to contact the shell upper surface from a stationary mounting above the processing table 69. In the case of scallops where the roe 26 is being held above the aductor muscle 20, the severing blade 92 may remove a small portion of the roe 26 radially outwardly of the uppermost part of the adductor muscle 20 (FIG. 12). This loss of edible material is not believed to be significant. The blade 92 is preferably extended to its furthest extent in contact with the upper surface of shell 11 for several revolutions of the shell 11.

As an alternative to a single severing blade 92, FIGS. 10 and 11 show rotary severing heads 94 having cutting edges on their outer peripheries. The rotary heads 94 would be arranged to be lowered to the upper surface of the shell 11 while the shell 11 is rotated. The cutting edges of the heads 94 would be arranged to just touch the edible portion 20 as the shell 11 is rotated so that the offal 25 is engaged by the cutting edges and is severed from the edible portion 20 and thrown centrifugally away from the rotating shell 11.

As an alternative to use of severing means 91 for separating the offal 25, FIG. 21 schematically illustrates a method of separating the offal comprising directing a fluid stream at the shell 11 so as to contact the offal 25 and detach the offal 25 from the edible portion 20. The fluid stream may comprise a jet of pressurised air directed at the inner surface of the shell 11. As shown in FIG. 21, the means for directing the fluid stream at the shell 11 may comprise a nozzle 98 arranged to be supplied with pressurised fluid, preferably only while the shell 11 is being rotated at the offal removal station. The fluid stream is preferably directed at the shell 11 for at least several revolutions of the shell.

After separation of the offal 25, the edible portion is recovered by passing a removal tool 100 (FIGS. 13 and 22) beneath the edible portion 20 along the inner surface of the shell 11. The removal tool 100 comprises a cutting blade 101 which is selectively movable from a retracted position to an advanced position, the cutting blade 101 in moving to the advanced position passing along the inner surface of the shell 11 and beneath the edible portion 20 to thereby cut that portion 20 from the shell 11. In FIG. 13 the cutting blade 101 is a rotary blade and is carried out after the processing table 69 is advanced to a recovery station where the rotary removal blade 101 is located and enabling subsequent shellfish to be processed at the offal removal station. In the case where the roe 26 was held lifted during the offal removal process, the roe lifting means 86 may be disengaged to release the roe 26 before the processing table 69 advances the shell 11 to the edible portion recovery station. Alternatively, the vacuum supplied to the suction tube 87 may be maintained, thereby holding the edible portion 20 suspended for subsequent release, say down a chute after rotation of the table 69 to carry away the shell 11. Also, of course, the rotation of the shell 11 would be stopped before recovery of the edible portion 20. In FIG. 22, the blade is shown as a generally wedge-shaped blade 101, preferably having a relatively flexible tip so as to follow the inner surface of the shell 11 in cutting of the edible portion 20 from the shell 11. FIG. 22 also shows the recovering means including a suction head 102 operable to be applied to the edible portion 20 during passage of the removal tool 100 beneath the edible portion 20 whereby the suction head 102 will hold and enable recovery of the edible portion 20 following complete removal of the portion 20 from the shell 11.

After recovery of the edible portion 20, the shell 11 can be discarded. For this purpose, the processing table 69 can be advanced to locate the shell at a further station where the holding means 67 is released and the shell 11 can be ejected or pushed from the processing table 69 and discarded. After discarding of the shell 11, the support base 68 is then free for advancement to the position in which a subsequent shellfish can be placed on the support base 68 and clamped for processing as shown in FIG. 8.

Turning now to FIG. 19, the shellfish 10 in this further arrangement can be advanced by conveyor belt 31 past edible portion locating means 110 operable to optically scan the shellfish 10 to detect the position of the edible portion 20 thereof. This system can be used in place of relying on the edible portion being always consistently located in a particular position relative to the general shell configuration. In the case of scallop processing, the shells when clean are translucent and the position of the adductor muscle can be seen when a relatively strong light is placed behind the shellfish. Therefore, the locating means 110 includes a radiation source 110 and an electronic optical scanning means 112 and having associated processing circuitry operable to determine the exact position of the adductor muscle in the shellfish 10.

The shellfish 10 then pass to the processing apparatus arranged on table 115. In this arrangement, the means 13 for parting the two shells includes a suction cup 44 engageable with the detached shell, the suction cup 44 being mounted on the end of a double-acting air ram 116. The air ram is selectively operable to engage the suction cup 44 with the outer surface of the detached shell (12) and is operable to retract the suction cup 44 after application of vacuum to that cup 44 to thereby part the two shells. The means for detaching the edible portion from the detached shell 12 may be generally the same as described hereinbefore in relation to FIGS. 3 and 4, the detaching means not being illustrated in FIG. 19 but being mounted above table 115. The air ram 116 is operable to further retract the suction cup 44 after detachment of the adductor muscle 20 from the detached shell 12 to thereby affect separation of the two shells 11,12.

As shown in FIG. 19, the air ram 116 is mounted on a rotary support 117 selectively drivable through shaft 118 so as to carry away from the belt 31 the detached shell 12, preferably to the position where the second air ram 116a is shown holding shell 12 beyond the edge of table 115. In this position the ram 116a is preferably operable to drop the shell 12 by discontinuing application of vacuum to the suction cup 44. This can be achieved under timer control but, as shown in FIG. 19, this can also be achieved by position responsive control means illustrated as a control valve 119 located in the vacuum line 120 to suction cup 44a. The valve 119 is operated by a plunger 121 which is normally extending downwardly below the bottom of the valve body 119 and, in this position, allows application of vacuum through line 120 to the cup 44a. However, the table 115 is provided with a cam track 122 up which the plunger rides when the rotary support 117 carries the ram 116a to the position shown in FIG. 19. When the plunger 121 rides up the cam track 122 the suction cup 44a is opened to atmosphere through valve 119 so that the shell 12 will be dropped. It will be appreciated, however, that a single air ram 116 need only be provided, the ram 116 being mounted on table 115 and being operable to retract the detached shell 12 sufficiently far from the belt 31 to enable dropping of the shell 12 into a discharge chute or the like.

As an alternative to use of a valve 119 controlled by plunger 121 and cam 122, the valve 119 may be operated to selectively apply and disconnect a vacuum source to suction cup 44a by means of a timer. In this case the valve 119 can be electrically operated under timer control. The timer may conveniently be provided by or associated with a suitably programmed sequence controlling microprocessor.

In FIG. 19, the holding means for the retained shell 11 including a suction applying head 41 engageable with the outer surface of the retained shell 11 so as to hold the same against movement relative thereto, the rotating means 85 being operable to rotate the suction head 41. The rotating means 85 in FIG. 19 is shown as an air motor 125 although other suitable rotating means could be used if desired. The area of engagement of the head 41 with the outer surface of the shell 11 on belt 31 is preferably located directly behind the edible portion 20 of the shellfish attached to the inner surface of the shell 11. With this arrangement the rotating means 85 would be operable to rotate the suction applying head 41 about the axis extending through the general centre of the edible portion 20 to achieve this placement of the suction applying head 41 relative to the shell 11, the head 41 and the retained shell 11 are movable relative to each other before engagement of the head 41 with the outer surface of the shell 11 thereby enabling accurate engagement of the suction-applying head directly behind the edible portion 20. This relative movement of the head 41 and shell 11 can be achieved as shown in FIG. 19 by selective control of the longitudinal movement of belt 31 and by selective control of the relative vertical position of the return point 126 of belt 31. To achieve the control there may be provided control means 127 which may be microprocessor controlled and which is responsive to the locating means 110 and operable to control both longitudinal movement of the belt 31 and vertical movement through selectively controllable lifting means 128, whereby enabling accurate engagement of the suction applying head 41 directly behind the edible portion 20.

The rotating means 85 comprises an air motor 125 having a rotatable shaft 130 therethrough, the suction applying head 41 being mounted on a forward end of the shaft 130. Referring to FIG. 20, the shaft 130 of the air motor 125 has a bore 131 therethrough, one end of the bore opening at the suction applying head 41 and the other end 132 being in sealed fluid communication with a line 133 leading to a vacuum source (not shown). With this arrangement, the air motor can be operated to rotate the head 41 and the shell 11 held thereby, while at the same time allowing vacuum to be applied through the air motor shaft to the head 41.

Returning to FIG. 19, the air motor 125 is shown mounted on an indexing means 91 shown as a rotary support 135 movable by means of drive shaft 136. The support 135 is operable to sequentially move the retained shell 11 through an offal removal station (say where air motor 125a is shown located) at which the air motor 125 is operable to rotate the shell 11 and the separating means is operable to separate the offal 25 from the edible portion 20 to be recovered, and through an edible portion recovery station (say where air motor 125b is shown located) where the edible portion 20 of the shellfish is recovered from the shell 11. After this, the indexing means 91 may move the air motor to a shell discarding station (say where air motor 125c is located) and at which the vacuum supply to the head 41 can be discontinued so as to enable dropping of the shell 11. The offal separating means and edible portion recovery means located around the table 115 are not shown but can be substantially as described earlier for other embodiments of the invention.

FIG. 23 illustrates schematically a further possible arrangement of the apparatus of the invention in which the rotating means 85 again comprises an air motor 125 which is mounted so as to hold the retained shell 11 generally at one site. In this Figure, the apparatus further includes an indexing means 140 having mounted thereon, so as to be sequentially presentable at the site, firstly a detached shell separating means for separating the detached shell 12 from the retained shell 11, secondly the separating means 90 and thirdly recovery means 142 for recovering the edible portion 20 from the retained shell 11. The separating means 141 may be an air ram having a suction head on the forward end as described earlier. Similarly, the separating means 90 may be as earlier described and the recovery means 142 may include a suction device of the kind shown by the numeral 102 in FIG. 22 while the blade 101 may be mounted above the site where the air motor 125 is located so as to be movable to cut the edible portion 20 from the shell 11 during the recovery operation.

Throughout the description of the method and apparatus with reference to the drawings, air operated motors and air rams have been referred to and, of course, these would be supplied with compressed air through a suitable pneumatic circuit. However, it will be appreciated that hydraulic motors and hydraulic rams, or electric motors, may be used as alternatives and the invention is not limited to use of pneumatics.

It will be seen that the preferred method and apparatus for processing shellfish as herein described with reference to the accompanying drawings is suitable for automatic processing of shellfish, particularly scallops. The process may be carried out on board a fishing boat so that the edible portion can be chilled or frozen on board shortly after harvesting, thus both reducing the refrigeration capacity needed compared to refrigeration of the entire shellfish, and also ensuring that the shellfish are quite fresh when they reach port. Of course, the process and apparatus could also be used on shore in a processing plant.

Finally, it is to be understood that various alterations, modifications and/or additions may be made to the steps and to the construction and arrangement of parts as herein described without departing from the scope of the present invention as defined in the appended claims.

What I claim is:

1. A method of mechanically processing a fresh live scallop having two shells having facing inside surfaces and being hinged together at a hinge region of the shells, an edible portion comprising an adductor muscle attached to the two facing inside surfaces of the two shells, and an offal portion, the method being for use in the recovery of the adductor muscle, the method comprising the steps of:
   mechanically slightly parting the two shells of the scallop by applying oppositely directed forces to the two shells at a position displaced from said hinge region so that the scallop hinges open slightly about the hinge region of the two shells;
   subsequently and while the oppositely directed forces are applied and the two shells are thus slightly parted, introducing detaching means into the region between the two shells and detaching the adductor muscle from a first one of said two shells to thereby substantially reduce the force required for complete separation of the two shells; and,
   subsequently separating the two shells completely including separating the two shells at the hinge region so as to leave the adductor muscle attached to the other retained one of said shells.

2. a method as claimed in claim 1 wherein the parting step comprises applying suction to each shell outer surface by suction means and relatively moving the suction means apart so as to part the two shells.

3. Aprocess as claimed in claim 1 wherein the edible portion of the shellfish includes an adductor muscle which is used by the shellfish for opening and closing of the two shells and which is attached to the inner surface of both the shells, and wherein the detaching step comprises detaching the adductor muscle from the detached shell at or close to the inner surface thereof.

4. A method of mechanically processing a fresh live scallop having two shells having outside surfaces and facing inside surfaces and being hinged together at a hinge region of the shells, an edible portion comprising an adductor muscle attached to the two facing inside surfaces of the two shells, and an offal portion, the method being for use in the recovery of the adductor muscle, the method comprising the steps of:
   applying suction to each said outer surface by respective suction means and relatively moving the suction means apart so that the two shells hinge slightly apart about the hinge region of the two shells;

subsequently and while the suction means are holding the two shells slightly apart, introducing detaching means into the region between the two shells and detaching the adductor muscle from a first one of said two shells to thereby substantially reduce the force required for complete separation of the two shells; and, subsequently separating the two shells completely including separating the two shells at the hinge region so as to leave the adductor muscle attached to the other retained one of said shells.

5. A method of mechanically processing bivalve shellfish having two shells, an edible portion and an offal portion for use in the recovery of the edible portion, the method comprising the steps of:

detaching the edible portion of the shellfish from a first one of the two shells so as to allow subsequent complete separation of the two shells;

completely separating the two shells leaving the edible and offal portions of the shellfish attached to the other retained one of said shells;

holding said retained shell and, while holding the retained shell, rotating the retained shell about an axis extending transverse to the general plane of the retained shell and through the general centre of the edible portion; and, while rotating the retained shell about said axis through the centre of the edible portion, separating the offal portion from around the outside of the edible portion to be recovered.

6. A method as claimed in claim 5 wherein the shellfish comprises a scallop, said edible portion comprising an adductor muscle of the scallop, said offal portion surrounding said adductor muscle, said retained shell being rotated about an axis passing through the centre of the adductor muscle and said offal portion being separated from the adductor muscle as the retained shell is rotated.

7. A method of mechanically processing bivalve shellfish having two shells, an edible portion and an offal portion for use in the recovery of the edible portion, the method comprising the steps of:

detaching the edible portion of the shellfish from a first one of the two shells so as to allow subsequent complete separation of the two shells;

completely separating the two shells leaving the edible and offal portion of the shellfish attached to the other retained one of said shells;

holding said retained shell and, while holding the retained shell, rotating the retained shell about an axis transverse to the general plane of the retained shell; and, while rotating the retained shell, separating the offal portion from the edible portion to be recovered so that the centrifugal forces caused by the shell rotation assist the removal of the offal portion.

8. A method as claimed in claim 7 wherein the axis of rotation of the shell passes through the general centre of the edible portion of the shellfish attached to the retained shell.

9. The method as claimed in the claim 7, wherein the step of separating the offal portion, comprises severing the offal portion from the edible portion.

10. A method as claimed in claim 7, wherein said step of separating the offal portion comprises directing a fluid stream at the retained shell so as to contact the offal portion and detach the offal portion from the edible portion.

11. A method of mechanically processing a scallop having two shells, an edible portion including roe, and an offal portion including a mantle, the method comprising the steps of:

detaching the edible portion and offal portion from a detached one of the two shells so as to allow subsequent complete separation of the shells;

completely separating the two shells leaving the edible and offal portions of the scallop attached to the other retained one of said shells;

holding said retained shell;

holding said roe away from the mantle; and, while holding the retained shell and while holding the roe away from the mantle, rotating the retained shell about an axis transverse to the general plane of the retained shell; and while rotating the retained shell, separating the offal portion including the mantle from the edible portion including the roe to be recovered so that centrifugal forces caused by the shell rotation assist the removal of the offal portion.

12. A method of mechanically processing a bivalve shellfish having two shells, an edible portion and an offal portion for use in the recovery of the edible portion and a method comprising the steps of:

detaching the shellfish from a detached one of the two shells so as to allow subsequent complete separation of the shells;

completely separating the two shells leaving the edible and offal portions of the shellfish attached to the other retained one of said shells;

holding said retained shell; and, while holding the retained shell, rotating the retained shell about an axis transverse to the general plane of the retained shell; and while rotating the retained shell, separating the offal portion from the edible portion to be recovered, the speed of rotation of the retained shell being sufficient for the offal portion to be thrown centrifugally away from the rotating retained shell during the offal separating step so as to leave only the edible portion attached to the retained shell.

13. Apparatus for processing a bivalve shellfish having two shells, an edible portion and an offal portion for use in the recovery of the edible portion, the apparatus comprising:

holding means for holding a retained one of the two shells having the edible portion and the offal portion attached thereto after complete separation of the other detached one of the two shells from the retained shell;

the holding means including a suction-applying head engageable with the outer surface of the retained shell so as to hold the same against movement relative thereto;

the area of engagement of the suction-applying head with the outer surface of the retained shell being located directly behind the edible portion of the shellfish attached to the innter surface of the retained shell;

rotating means for rotating the suction-applying head so as to thereby rotate the retained shell when held by the suction-applying head about an axis extending transverse to the general plane of the retained shell and through the general center of the edible portion; and, separating means for separating the offal portion from the edible portion to be recovered while the retained shell is being rotated about said axis, the centrifugal forces caused by the shell rotation assisting the removal of the offal portion.

14. Apparatus as claimed in claim 13 wherein the suction applying head and retained shell are movable relative to each other before engagement of the suction applying head with the outer surface of the retained shell so as to enable accurate engagement of the suction applying head directly behind the edible portion, said apparatus further including edible portion locating means operable to optically scan the shellfish to detect the position of the edible portion thereof, and control means responsive to the locating means and operable to control relative movement of the suction applying head and retained shell during mutual engagement so as to achieve accurate engagement of the suction applying head directly behind the edible portion.

15. Apparatus for processing a scallop having two shells, an edible portion including roe and an offal portion including a mantle, the apparatus including:
holding means for holding a retained one of the two shells having the edible portion and the offal portion attached thereto after complete separation of the other detached one of the two shells from the retained shell;
rotating means for rotating the retained shell when held by the holding means about an axis extending transverse to the general plane of the retained shell;
means for holding the roe away from the mantle while the retained shell is being rotated by the rotating means, said means for holding the roe comprising:
a suction tube having an open mouth which is relatively movable into close proximity with the roe so as to draw the roe into or towards the mouth without tearing the roe from the edible portion; and,
separating means for separating the offal portion including the mantle from the edible portion including the roe to be recovered while the retained shell is being rotated about said axis by rotating means; and,
the centrifugal forces caused by the shell rotation assisting the removal of the offal portion including the mantle.

16. Apparatus for processing a bivalve shellfish having two shells, an edible portion and an offal portion for use in the recovery of the edible portion, the apparatus comprising:
holding means for holding a retained one of the two shells having the edible portion and the offal portion attached thereto after complete separation of the other detached one of the two shells from the retained shell;
rotating means for rotating the retained shell when held by the holding means about an axis extending transverse to the general plane of the retained shell; and,
separating means for separating the offal portion whie the retained shell is being rotated about said axis, the rotational speed of the rotating means being such that as the offal portion is separated from the edible portion to be recovered by the separating means, the offal portion is thrown centrifugally away from the rotating retained shell and edible portion leaving only the edible portion attached to the retained shell.

17. Apparatus for mechanically processing a fresh live scallop having two shells, having facing inside surfaces and being hinged together at a hinge region of the two shells, an edible portion comprising an adductor muscle attached to the two facing inside surfaces of the two shells, and an offal portion, the apparatus being for use in the recovery of the adductor muscle, the apparatus including:
means for mechanically slightly parting the two shells of the scallop by applying oppositely directed forces to the two shells at a position displaced from said hinge region so that the scallop hinges open slightly about the hinge region of the two shells;
means for detaching the adductor muscle from a first one of said two shells, the detaching means being arranged to be introduced into the region between the inside surfaces of the two shells while the oppositely directed forces are applied by the parting means and while the two shells are slightly parted; and
means for subsequently separating the two shells completely including separating the two shells at the hinge region so as to leave the adductor muscle attached to the other retained one of said shells.

18. Apparatus for mechanically processing a fresh live scallop as claimed in claim 17 wherein said parting means comprises two suction means for applying suction to a respective one of said two shells and means for relatively moving the two suction means apart so that the two shells hinge slightly apart about the hinge region of the two shells.

19. Apparatus as claimed in claim 17 and further including feeding means for sequentially feeding shellfish to said parting means, the feeding means comprising a conveyor having longitudinally spaced slots along its length, the apparatus further including an inclined feed chute sloping down to the conveyor and arranged so that shellfish can be fed onto said conveyor with the hinge region of each shellfish being arranged to be received in a respective one of said slots.

20. Apparatus as claimed in claim 17 wherein said detaching means comprises cutting means operative to be inserted between the two shells when held parted by the parting means and closely adjacent to the inner surface of the detached shell.

21. Apparatus as claimed in claim 20 wherein the cutting means comprises a cutting blade which is flexible so as to follow the inner surface of the detached shell and to thereby cut the attachment of the shellfish to that detached shell closely adjacent to its inner surface, the cutting blade being inserted between the shell peripheries generally opposite to the hinge region and at a shallow angle to the general plane of symmetry of the parted shells so as to engage with the inner surface of the detached shell before contacting the attachment of that shellfish to that detached shell.

22. Apparatus as claimed in claim 17 wherein the parting means is operative to draw the two shells apart and comprises two suction means arranged to be applied to respective outer surfaces of the two shells, the suction means being selectively movable towards each other so as to engage with and grip by suction the outer surfaces and selectively movable away from each other to draw the two shells apart.

23. Apparatus as claimed in claim 22 wherein the two suction means comprise a pair of opposed suction cups engageable respectively with the outer surfaces of the two shells, each of the suction cups being arranged to be selectively connected to a vacuum source to thereby securely hold the respective shell when engaged with the outer surface thereof and supplied with a vacuum, the suction cups being movable apart to a predetermined extent so as to part the two shells, one of the suction cups being mounted on a rotary head operable to be rotated so as to intermittently present that rotary mounted suction cup at a shell parting station so that as a shellfish to be subsequently processed is presented at the shell parting station the rotary head is operable to synchronously present the rotary mounted suction cup to the outer surface of the shell.

24. Apparatus for processing a bivalve shellfish having two shells, and edible portion and an offal portion for use in the recovery of the edible portion of the shellfish, the apparatus comprising:

holding means for holding a retained one of the two shells having the edible portion and the offal portion attached thereto after complete separation of the other detached one of the two shells from the retained shell, rotating means for rotating the retained shell when held by the holding means about an axis extending transverse to the general plane of the retained shell, and separating means for separating the offal portion from the edible portion to be recovered while the retained shell is being rotated about said axis, the centrifugal forces caused by the shell rotation assisting the removal of the offal portion.

25. Apparatus as claimed in claim 24 wherein said axis extends through the general centre of the edible portion of shellfish.

26. Apparatus for processing a bivalve shellfish having two shells, an edible portion and an offal portion for use in the recovery of the edible portion of the shellfish, the apparatus comprising:

detaching means for detaching the edible portion of the shellfish from a first one of the two shells so as to allow subsequent complete separation of the two shells;

means for completely separating the two shells leaving the edible and offal portions of the shellfish attached to the other retained one of said two shells;

holding means for holding the retained one of the two shells having the edible portion and the offal portion attached thereto after complete separation of said first one of the two shells from the retained shell; and, rotating means for rotating the retained shell when held by the holding means about the axis extending transverse to the general plane of the retained shell and extending through the general centre of the edible portion of the shellfish; and separating means for separating the offal portion from around the outside of the edible portion to be recovered while the retained shell is being rotated about said axis extending through the edible portion.

27. Apparatus as claimed in claim 26 wherein the holding means includes a suction applying head engageable with the outer surface of the retained shell so as to hold the same against movement relative to suction applying head, the area of engagement of the suction applying head with the outer surface of the retained sheel being located directly behind the edible portion of the shellfish attached to the inner surface of the retained shell, said rotating means being operable to rotate the suction applying head so as to thereby rotate the retained shell about an axis transverse to the general plane of the retained shell and through the general centre of the edible portion.

* * * * *